(No Model.)
J. J. BUGHMAN.
FARM GATE.
No. 377,844. Patented Feb. 14, 1888.
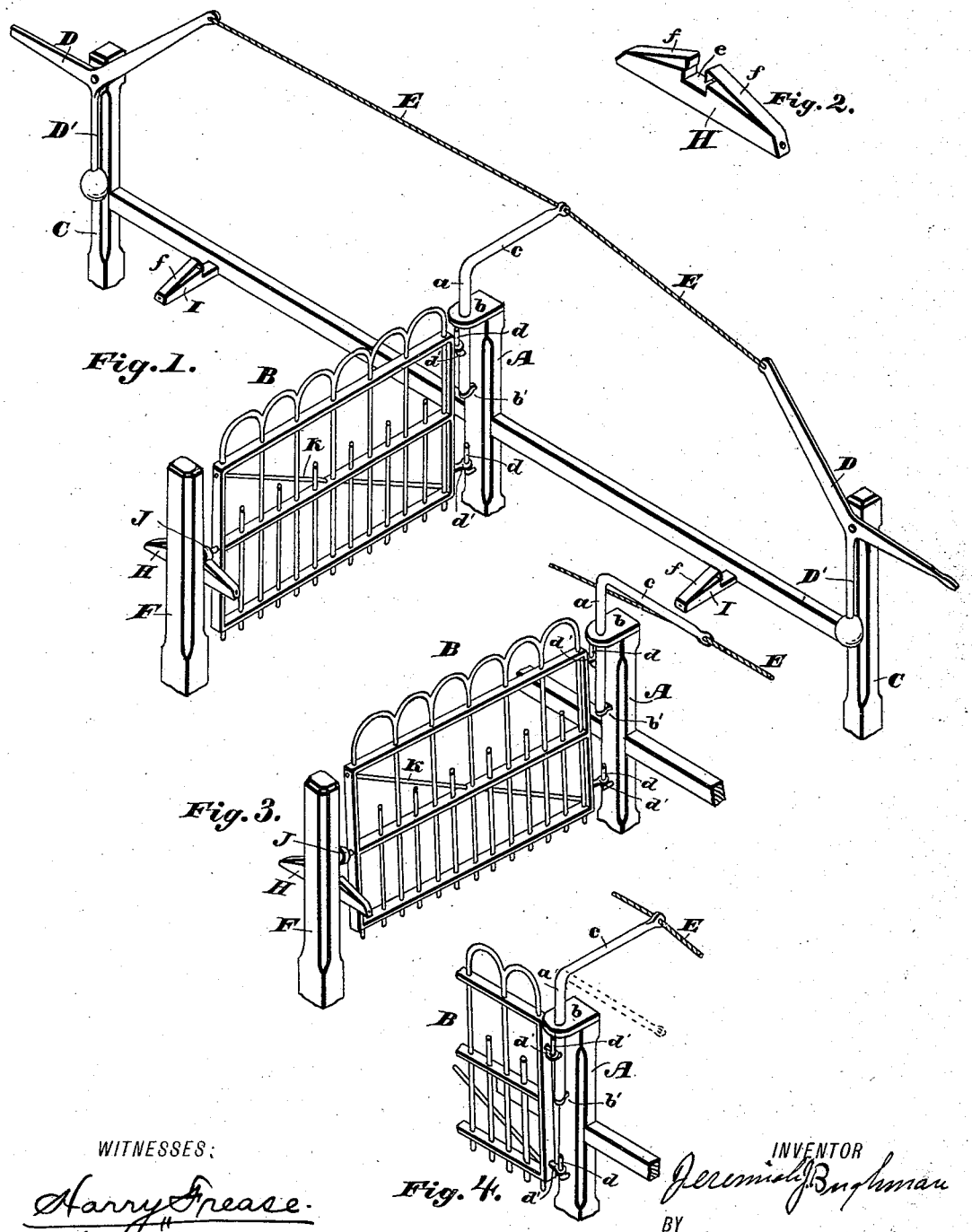
WITNESSES:
Harry Frease
Harry S. Read
INVENTOR
Jeremiah J. Bughman
BY
Bond & Wise
ATTORNEYS

UNITED STATES PATENT OFFICE.

JEREMIAH J. BUGHMAN, OF JUSTUS, OHIO.

FARM-GATE.

SPECIFICATION forming part of Letters Patent No. 377,844, dated February 14, 1888.

Application filed October 24, 1887. Serial No. 253,258. (No model.)

*To all whom it may concern:*

Be it known that I, JEREMIAH J. BUGHMAN, a citizen of the United States, residing at Justus, in the county of Stark and State of Ohio, have invented certain new and useful Improvements in Farm-Gates; and I do hereby declare that the following is a full, clear, and exact description of the same, reference being had to the annexed drawings, making a part of this specification, and to the letters and figures of reference marked thereon, in which—

Figure 1 is a perspective view showing the gate placed in proper position and closed. Fig. 2 is a detached view of the catch. Fig. 3 is a view showing the free end of the gate elevated. Fig. 4 is a view of a portion of the gate, showing it open.

The present invention has relation to farm-gates; and it consists in the different parts and combination of parts, hereinafter described, and particularly pointed out in the claims.

Similar letters of reference indicate corresponding parts in all the figures of the drawings.

In the accompanying drawings, A represents the hinge-post, which is held in proper position in the ordinary manner. To the top or upper end of the hinge-post A is pivotally attached the operating-bar $a$, said operating-bar being held in proper position by means of the cap $b$ and the eye $b'$, or their equivalents. The top or upper end of the operating-bar $a$ is provided with the lever $c$, which is for the purpose hereinafter described. The operating-bar $a$ and the post A are each provided with a hook, $d$. These are for the purpose of receiving the eyes $d'$, thereby forming hinges for the gate B. It will be understood that the gate B may be of any size and style desired.

On each side of the hinge-post A is placed one of the posts C, said posts being located at any desired distance from the hinge-post A. To the tops or upper ends of the posts C are pivotally attached the arms D, said arms being substantially of the form shown in the drawings. For the purpose of retaining the arms D in proper working position, the pendent arms D' are provided, said arms being sufficiently weighted to counterbalance the arms D properly. To the inner ends of the arms D are attached the pull-cords E, the opposite ends of said pull-cords being attached to the free end of the lever $c$, substantially as shown in Fig. 1. To the post F is securely attached the catch H, said catch being provided with the notch or recess $e$, as shown in Fig. 2. The catches I are located substantially as shown in the drawings, and are for the purpose of holding the gate B open. The catches H and I are provided with springs $f$, said springs being substantially of the form shown in the drawings, for the purpose of automatically engaging the roller J, located at the free end of the gate B.

In use, when it is desired to open the gate, the outer end of one of the arms D is pulled downward, thereby placing the operating-bar $a$ in the position shown in Fig. 3, and at the same time elevating the free end of the gate and disengaging the roller J from the catch H, when the gate is free to swing by its own weight to the position shown in Fig. 4. When it is desired to close the gate, the opposite arm, D, is pulled downward, thereby disengaging the roller J from the catch I, when the gate is free to close by its own weight. For the purpose of preventing the gate from sagging, the brace K is provided.

Having fully described my invention, what I claim as new, and desire to secure by Letters Patent, is—

1. The combination of the gate B, hinged to the post A and to the bar $a$, and provided at its free end with the roller J, the arms D, provided with the pendent weighted arms D', the pull-cords E, and the lever $c$, substantially as and for the purpose specified.

2. The combination of the gate B, hinged to the post A and to the bar $a$, the arms D, provided with the pendent arms D', the pull-cords E, and the lever $c$, substantially as and for the purpose specified.

In testimony that I claim the above I have hereunto subscribed my name in the presence of two witnesses.

JEREMIAH J. BUGHMAN.

Witnesses:
A. J. FULMER,
L. C. WISE.